(12) United States Patent
Farkas et al.

(10) Patent No.: US 6,790,871 B1
(45) Date of Patent: Sep. 14, 2004

(54) ISOCYANATE-BASED POLYMER FOAM AND PROCESS FOR PRODUCTION THEREOF

(75) Inventors: Paul V. Farkas, Willowdale (CA); Liberato V. Mendoza, Brampton (CA); Romeo Stanciu, Toronto (CA); Jeffrey D. van Heumen, Guelph (CA)

(73) Assignee: Woodbridge Foam Corporation, Mississauga (CA)

( * ) Notice: Subject to any disclaimer, the term of this patent is extended or adjusted under 35 U.S.C. 154(b) by 120 days.

(21) Appl. No.: 09/709,450

(22) Filed: Nov. 13, 2000

(51) Int. Cl.$^7$ .............................................. C08G 18/28
(52) U.S. Cl. ........................ 521/99; 521/117; 521/155; 521/170; 521/174
(58) Field of Search .......................... 521/99, 155, 170, 521/171, 117

(56) References Cited

U.S. PATENT DOCUMENTS

| | | | |
|---|---|---|---|
| 4,987,156 A | * 1/1991 | Tozune et al. ................ | 521/99 |
| 5,432,204 A | 7/1995 | Farkas .......................... | 521/49 |
| 6,169,124 B1 | 1/2001 | Horn et al. .................. | 521/155 |
| 6,384,130 B1 | 5/2002 | Pantone ...................... | 524/590 |
| 6,391,935 B1 | 5/2002 | Hager et al. ................. | 521/170 |

* cited by examiner

Primary Examiner—John M. Cooney
(74) Attorney, Agent, or Firm—Katten Muchin Zavis Rosenman

(57) ABSTRACT

A flexible isocyanate-based polymeric foam which has: (i) low resiliency; (ii) a Tg less than or equal to about 0° C.; and (iii) a change in tan δ less than or equal to about 35% from a median value measured over a temperature range of from about −20° to about +60° C. The foam may be produced using a formulation comprising selected plasticizers as set in the disclosure. The subject foam is less temperature sensitive than currently known low resilience, flexible polyurethane foams. Thus, the present foam finds many applications such as for use in the interior of a vehicle where energy dissipation of the foam is important over a relatively wide temperature range—e.g., −20° to +60° C.

11 Claims, 1 Drawing Sheet

ISOCYANATE-BASED POLYMER FOAM AND PROCESS FOR PRODUCTION THEREOF

BACKGROUND OF THE INVENTION

1. Field of the Invention

The present invention relates to an isocyanate-based polymer foam and to a process for production thereof. More particularly, the present invention relates to an isocyanate-based polymer foam, inter alia, having improved properties over a broader temperature range compared to prior art foams.

2. Description of the Prior Art

Isocyanate-based foams, such as polyurethane foams, are known in the art.

It is known in the art that polyurethane foams have energy dissipating properties. Thus, heretofore, such foams have been used in helmets, shoe insoles, furniture, seating applications and the like. These foams have also found widespread use in vehicular applications such as head rests, arm rests, door panels, knee bolsters, air bag doors, headliners, bumpers, instrument panels, sun visors and other areas of the vehicle intended to dissipate energy upon impact.

One class of polyurethane foams which is of interest is the so-called "low resilience", flexible polyurethane foams. Such foams have a low rate of recovery from an applied stress and a low resilience as measured by the ball rebound test. Specifically, low resilience, flexible polyurethane foams are known to have ball rebound values of less than about 30% (cf. about 40% for conventional slabstock polyurethane foam and 55–60% for high resilience, flexible polyurethane foams).

One problem with known low resilience, flexible polyurethane foams is that they are very temperature sensitive. Specifically, such foams will soften with increasing temperature and harden with decreasing temperature. The low resiliency properties of these foams is typically lost as the temperature increases. Further, it is known that other physical properties of these foams are quite sensitive to a number of factors including: (i) variations in isocyanate index of the formulation used to produce the foams, (ii) relative humidity, and the like.

The temperature sensitivity of these known foams has been used to advantage in certain applications. For example, since body heat can be sufficient to cause softening and conformation to shape of area being contacted, such foams have been used successfully in applications such as headphones, ski boots, hiking boots, skates and the like.

There are, however, a number of applications where it would be desirable to have a foam which maintains its properties over a relatively wide temperature range—i.e., a foam which was less temperature sensitive than currently known low resilience, flexible polyurethane foams. Such a foam would find many applications such as for use in the interior of a vehicle where energy dissipation of the foam is important over a relatively wide temperature range—e.g., −20° to +80° C. As will be appreciated by those of skill in the art, the use of a foam in the interior of a vehicle presents specific challenges since the service temperature of the vehicle may vary within such broad temperature ranges. Thus, a foam which is designed to dissipate energy upon impact and which behaves differently at different temperatures is disadvantageous.

Accordingly, it would be desirable to have an isocyanate-based foam, preferably a polyurethane foam which is a low resilient foam and which has an energy dissipation profile substantially unaffected over a relatively wide temperature range.

SUMMARY OF THE INVENTION

It is an object of the present invention to provide a novel isocyanate based foam which obviates or mitigates at least one of the above-mentioned disadvantages of the prior art.

It is another object of the present invention to provide a novel process for producing an isocyanate-based foam.

Accordingly, in one of its aspects, the present invention provides a flexible isocyanate-based polymeric foam which has:

(i) low resiliency;
(ii) a Tg less than or equal to about 0° C.; and
(iii) a change in tan δ less than or equal to about 35% from a median value measured over a temperature range of from about −20° to about +60° C.

In another of its aspects, the present invention provides a flexible, low resiliency foam derived from a reaction mixture comprising:

urethane-forming chemicals;
water; and
a plasticizer selected from the group comprising: a halogenated paraffin, a $C_2/C_4$ aliphatic polymer comprising a primary hydroxyl group, and mixtures thereof.

As is known in the art, viscoelastic materials are those for which the relation between stress and strain depends on time. The stiffness of such materials will depend on the rate of load application—e.g., increased rates increase the stiffness. Viscoelasticity is a characteristic of long chain structures (the difference between crystalline solids (metals) and plastics). As stated above, viscoelasticity is a time dependent property (e.g., delayed response), rendering polymers elastic solids and viscous liquids simultaneously. Under a dynamic load, a phase difference appears between stress and strain.

Thus, the present inventors have surprisingly and unexpected discovered that a particular selection of additives used to produce the isocyanate-based foam results in a foam having significantly improved properties. More particularly, the use of specific plasticizers, as set out herein, results in a low resiliency isocyanate-based foam having a glass transition temperature Tg less than or equal to about −0° C. and a change in tan δ less than or equal to about 35% from a median value measured over a relatively broad temperature range. A foam having such a combination of properties is highly desirable, and to the knowledge of the present inventors, is heretofore unknown. While not wishing to be bound by any particular theory or mode of action it is believe that the advantages of the present isocyanate-based foams may be the result of mechanical and/or chemical activity of the specific plasticizers set out herein which complements the properties of the foam based on the chemical structure design.

Preferably, Tg and tan δ are measured using the equipment and testing protocols set in the Examples hereinbelow.

Glass transition temperature or "Tg", as used throughout this specification, is intended to mean the temperature (in some cases, this may be a range of temperatures) when a polymer material softens with some polymer segments moving—maximum energy dissipation is achieved by the polymer at this point. Above the Tg, the polymer tends to be rubbery and, as the temperature is continuously increased, the polymer with melt The present isocyanate-based foams will find immediate advantageous use in a number of applications. For example, the present isocyanate-based foams may be used in vehicular applications such as head rests, arm rests, door panels, knee bolsters, air bag doors, headliners, bumpers, instrument panels, sun visors and other areas of the vehicle intended to dissipate energy upon impact. The present isocyanate-based foams are particularly useful in vehicular head rests.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Figure 1:
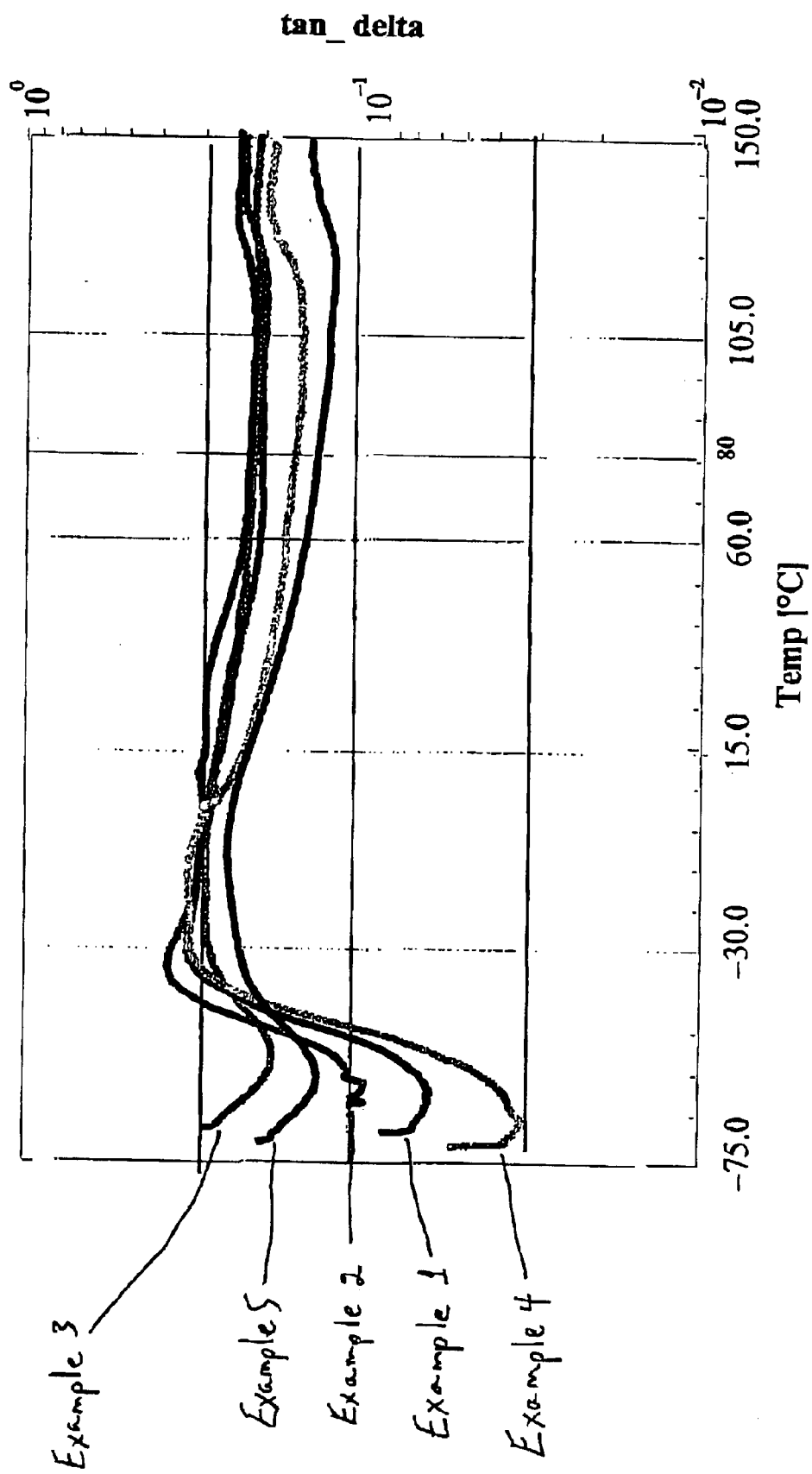
FIG. 1 illustrates a graphical representation of tan δ (E"/E' or loss modulus/stored modulus) for a number of foam samples produced in Examples 1–5 hereinbelow.

The present invention is related to flexible foamed isocyanate-based polymer and to a process for production thereof. Preferably, the isocyanate-based polymer is selected from the group comprising polyurethane, polyurea, urea-modified polyurethane, urethane-modified polyurea and isocyanuarate-modified polyurethane. As is known in the art, the term "modified", when used in conjunction with a polyurethane or polyurea means that up to 50% of the polymer backbone forming linkages have been substituted.

The present foamed isocyanate-based polymer preferably is produced from a reaction mixture which comprises an isocyanate and an active hydrogen-containing compound.

The selection of an isocyanate suitable for use in the reaction mixture is within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g., an alkylene or arylene group). Moreover, Q may be represented by the general formula:

$$Q^1—Z—Q^1$$

wherein $Q^1$ is an alkylene or arylene group and Z is chosen from the group comprising —O—, —O—$Q^1$—, —CO—, —S—, —S—$Q^1$—S— and —$SO_2$—. Examples of isocyanate compounds which fall within the scope of this definition include hexamethylene diisocyanate, 1,8-diisocyanato-p-methane, xylyl diisocyanate, $(OCNCH_2CH_2CH_2OCH_2O)_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate and isopropylbenzene-alpha-4-diisocyanate.

In another embodiment, Q may also represent a polyurethane radical having a valence of i. In this case $Q(NCO)_i$ is a compound which is commonly referred in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention may relate to the production of polyurea foams, it will be appreciated that in this embodiment, the prepolymer could be used to prepare a polyurethane modified polyurea.

In another embodiment, the isocyanate compound suitable for use in the process of the present invention may be selected from dimers and trimers of isocyanates and diisocyanates, and from polymeric diisocyanates having the general formula:

$$[Q''(NCO)_i]_j$$

wherein both i and j are integers having a value of 2 or more, and Q'' is a polyfunctional organic radical, and/or, as additional components in the reaction mixture, compounds having the general formula:

$$L(NCO)_i$$

wherein i is an integer having a value of $1^1$ or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides ($QSO_2NCO$), cyanic acid and thiocyanic acid.

See also for example, British patent number 1,453,258, for a discussion of suitable isocyanates.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis(3-methyl-4-isocyanatophenyl)methane, polymethylene polyphenyl polyisocyanates and mixtures thereof.

A more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate.

Another more preferred isocyanate is selected from the group comprising 2,4'-diphenylmethane diisocyanate, 4,4'-diphenylmethane diisocyanate, modified 4,4'-diphenylmethane diisocyanate (modified to liquefy the diisocyanate at ambient temperature) and mixtures thereof.

The most preferred isocyanate is a mixture comprising (i) a prepolymer of 4,4'-diphenylmethane diisocyanate and (ii) a carbodiamide-derivative based on 4,4'-diphenylmethane diisocyanate. Preferably the mixture comprises a weight ratio of (i):(ii) in the range of from about 1:1 to about 9:1.

Preferably, the isocyanate used in the present process has a functionality in the range of from about 2.0 to about 2.7, more preferably in the range of from about 2.0 to about 2.3.

The isocyanate preferably is used in an amount to provide an isocyanate index, inclusive of all reactive equivalents in the reaction mixture, in the range of from about 60 to about 110, more preferably from about 70 to about 100, most preferably from about 80 to about 90.

If the process is utilized to produce a polyurethane foam, the active hydrogen-containing compound is typically a polyol.

The choice of polyol suitable for use herein is within the purview of a person skilled in the art. For example, the polyol may be a hydroxyl-terminated backbone of a member selected from the group comprising polyether, polyester, polycarbonate, polydiene and polycaprolactone. Preferably, the polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising adipic acid-ethylene glycol polyester, poly(butylene glycol), poly(propylene glycol) and hydroxyl-terminated polybutadiene—see, for example, British patent number 1,482,213, for a discussion of suitable polyols.

A preferred polyol comprises polyether polyols. Preferably, such a polyether polyol has a molecular weight in the range of from about 200 to about 10,000, more preferably from about 2,000 to about 8,000, most preferably from about 4,000 to about 7,000.

Further, it is possible to utilize a prepolymer technique to produce a polyurethane foam within the scope of the present invention. In one embodiment, it is contemplated that the prepolymer be prepared by reacting an excess of isocyanate with a polyol (as discussed above). The prepolymer could then be reacted with further polyol (the same or different than the first polyol) to produce a polyurethane foam or an amine to produce a polyurea-modified polyurethane.

If the process is utilized to produce a polyurea foam, the active hydrogen-containing compound comprises compounds wherein hydrogen is bonded to nitrogen. Preferably such compounds are selected from the group comprising polyamines, polyamides, polyimines and polyolamines, more preferably polyamines. Non-limiting examples of such compounds include primary and secondary amine terminated polyethers. Preferably such polyethers have a molecular weight of greater than about 230 and a functionality of from 2 to 6. Such amine terminated polyethers are typically made from an appropriate initiator to which a lower alkylene oxide is added with the resulting hydroxyl terminated polyol being subsequently aminated. If two or more alkylene oxides are used, they may be present either as random mixtures or as blocks of one or the other polyether. For ease of amination, it is especially preferred that the hydroxyl groups of the polyol be essentially all secondary hydroxyl groups. Typically, the amination step replaces the majority but not all of the hydroxyl groups of the polyol.

In another embodiment, the first polyol may comprise a polymer polyol, also known as graft copolymer polyols. As is known in the art, such polyols are generally polyether polyol dispersions which are filled with other organic polymers. Such polymer polyols are useful in load building or improving the hardness of the foam when compared to using unmodified polyols. Non-limiting examples of useful polymer polyols include: chain-growth copolymer polyols (e.g., containing particulate poly(acrylonitrile), poly(styrene-acrylonitrile) and mixtures thereof), and/or step-growth copolymer polyols (e.g., PolyHarnstoffDispersions (PHD), polyisocyanate polyaddition (PIPA) polyols, epoxy dispersion polyols and mixtures thereof). For further information on polymer polyols, see, for example, Chapter 2 of FLEXIBLE FOAM FUNDAMENTALS, Herrington et al. (1991) and the references cited therein. If a polymer polyol is used, it is preferred to admix the polymer polyol with a base polyol. Generally, mixtures may be used which contain polymer polyol in an amount in the range of from about 5 to about 50 percent by weight of unmodified polyol present in the mixture.

The reaction mixture used to produce the present foamed isocyanate-based polymer typically will further comprise a blowing agent. As is known in the art water can be used as an indirect or reactive blowing agent in the production of foamed isocyanate-based polymers. Specifically, water reacts with the isocyanate forming carbon dioxide which acts as the effective blowing agent in the final foamed polymer product. Alternatively, the carbon dioxide may be produced by other means such as unstable compounds which yield carbon dioxide (e.g., carbamates and the like). Optionally, direct organic blowing agents may be used in conjunction with water although the use of such blowing agents is generally being curtailed for environmental considerations. The preferred blowing agent for use in the production of the present foamed isocyanate-based polymer comprises water.

It is known in the art that the amount of water used as an indirect blowing agent in the preparation of a foamed isocyanate-based polymer is conventionally in the range of from about 0.5 to as high as about 10 or more parts by weight, preferably from about 1.0 to about 3.0 parts by weight, based on 100 parts by weight of the total active hydrogen-containing compound content in the reaction mixture. As is known in the art, the amount of water used in the production of a foamed isocyanate-based polymer typically is limited by the fixed properties expected in the foamed polymer and by the tolerance of the expanding foam towards self structure formation.

The reaction mixture used to produce the present foamed isocyanate-based polymer typically will further comprise a catalyst. The catalyst used in the reaction mixture is a compound capable of catalyzing the polymerization reaction. Such catalysts are known, and the choice and concentration thereof in the reaction mixture is within the purview of a person skilled in the art. See, for example, U.S. Pat. Nos. 4,296,213 and 4,518,778 for a discussion of suitable catalyst compounds. Non-limiting examples of suitable catalysts include tertiary amines and/or organometallic compounds. It is also possible to utilize the so-called delayed action catalysts. Of course it will be understood by those skilled in the art that a combination of two or more catalysts may be suitably used.

The plasticizer used in the present process a plasticizer is selected from the group comprising: a halogenated paraffin, a $C_2/C_4$ aliphatic polymer comprising a primary hydroxyl group, and mixtures thereof.

Preferably the plasticizer is used in an amount of less than about 20 parts by weight, more preferably from about 2 to about 15 parts by weight, most preferably from about 6 to about 10 parts by weight, per hundred parts by weight active hydrogen-containing compound used in the reaction mixture.

Preferably, the halogenated paraffin comprises a chlorinated paraffin. More preferably, the halogenated paraffin has a molecular weight in the range of from about 300 to about 800, preferably from about 400 to about 700, most preferably from about 500 to about 550. Preferably, the halogenated paraffin has a density in the range of from about 1.0 to about 1.5 g/mL, more preferably from about 1.2 to about 1.4 g/mL. Preferably, the halogenated paraffin has a viscosity at 25° C. of from about 5.0 to about 15 Pa·s, more preferably from about 8.0 to about 12 Pa·s. A non-limiting example of a halogentated paraffin having many of the preferred features is commercially available from Pioneer under the tradename Cereclor™ S-56.

As will be appreciated by those of skill in the art, a $C_2/C_4$ aliphatic polymer comprising a primary hydroxyl group comprises a polymer backbone derived from a mixture of a $C_2/C_4$ monomers. Since the hydroxyl group is primary is it is typically bonded to a terminal carbon atom in the polymer backbone. Preferably, the subject $C_2/C_4$ aliphatic polymer has an OH equivalent weight in the range of from about 3500 to about 4500, more preferably from about 3600 to about 4000, most preferably from about 3700 to about 3900. Further, it is preferred that the subject $C_2/C_4$ aliphatic polymer have a functionality in the range of from about 0.80 to about 1.20, more preferably from about 0.95 to about 1.05, most preferably in the range of from about 0.95 to about 1.00. Still further, it is preferred that the subject $C_2/C_4$ aliphatic polymer have a Tg (glass transition temperature) in the range of from about −70° to about −50° C., most preferably in the range of from about −65° to about 55° C. A non-limiting example of a $C_2/C_4$ aliphatic polymer comprising a primary hydroxyl group having many of the preferred features is commercially available from Shell under the tradename Kraton™ KLP L-1203.

Of course, those of skill in the art will recognize that halogenated paraffins and/or $C_2/C_4$ aliphatic polymers comprising a primary hydroxyl group other than the specific embodiments mentioned above may be used advantageously in the present process.

As will be clearly understood by those of skill in the art, it is contemplated that conventional additives in the polyurethane foam art can be used in the present process. Non-limiting examples of such additives include: filler materials, surfactants, cell openers (e.g., silicon oils), cross-linkers (e.g., low molecular weight reactive hydrogen-containing compositions), pigments/dyes, flame retardants (e.g., halogenated organo-phosphoric acid compounds), inhibitors (e.g., weak acids), nucleating agents (e.g., diazo compounds), anti-oxidants, UV stabilizers (e.g., hydroxybenzotriazoles, zinc dibutyl thiocarbamate, 2,6-ditertiary butylcatechol, hydroxybenzophenones, hindered amines and mixtures thereof), biocides, antistatic agents (e.g., ionizable metal salts, carboxylic acid salts, phosphate esters and mixtures thereof) and mixtures thereof. The amounts of these additives conventionally used is within the purview of a person skilled in the art—see, for example, Chapter 2 of FLEXIBLE FOAM FUNDAMENTALS, Herrington et al. (1991) and the references cited therein.

The manner by which the polyol mixture, isocyanate, blowing agent, particulate material and catalyst are contacted in the first step of the present process is not particularly restricted. Thus, it is possible to preblend the components in a separate tank which is then connected to a suitable mixing device for mixing with the blowing agent and catalyst. Alternatively, it is possible to preblend the active hydrogen-containing compound with the blowing agent, catalyst and other additives, if present, to form a resin. This resin preblend could then be fed to a suitable mixhead (high pressure or low pressure) which would also receive an independent stream of the isocyanate.

Once the active hydrogen-containing compound, isocyanate, blowing agent, chain extending agent and catalyst have been contacted and, ideally, mixed uniformly, a reaction mixture is formed. This reaction mixture is then expanded to produce the present isocyanate-based polyurethane foam. As will be apparent to those of skill in the art, the process of the present invention is useful in the production of slabstock foam, molded articles and the like. The manner by which expansion of the reaction mixture is effected will be dictated by the type of foam being produced.

Embodiments of the present invention will now be described with reference to the following Examples which should not be construed as limiting the scope of the invention. The term "plow" used in the Examples refers to parts by weight.

In the Examples, the following materials were used:
Voranol™ V4815, a polyol, commercially available from The Dow Chemical Company;
Poly G20-112, a polyol commercially available from Arch. Chemicals;
Poly G20-56, a polyol commercially available from Arch. Chemicals;
E850, a 43% solids content copolymer (SAN) polyol, commercially available from Bayer Corporation;
Isonate™ 143L, an isocyanate, commercially available from The Dow Chemical Company;
Rubinate™ 7302, an isocyanate, commercially available from Huntsman Chemicals;
DPG, dipropyleneglycol, a cross-linking agent;
DEOA-LF, diethanolamine, a cross-linking agent commercially available from Air Products;
Water, an indirect blowing agent;
Kraton™ L-1203, a plasticizer, commercially available from Shell;
Dabco™ 33LV, a gelation catalyst, commercially available from Air Products;
Niax™ A-1, a blowing catalyst, commercially available from Witco;
V-4053, a cell opener, commercially availabe from Dow Chemical Company;
DC-5169, a surfactant, commercially available from Air Products;
NP-50, a catalyst, commercially available from Huntsman Chemicals;
B-4113, a surfactant, commercially available from Goldschmidt;
B-8240, a surfactant, commercially available from Goldschmidt;
B-4690, a surfactant, commercially available from Goldschmidt
T-12, organometallic catalyst, commercially available from Air Products; and
Cereclor™ S-56, a plasticizer commercially available from Pioneer.

EXAMPLES 1–5

In these Examples, a series of polyurethane foams were produced using the formulations set forth in Table 1.

The general procedure used to produce the foam in the Examples was as follows.

In the Examples, the foam was produced using a machine pouring technique. Thus, in this technique, a resin blend was created in a drum by adding to the drum the specific amounts (see Table 1) of the following ingredients in the order listed: base polyol, surfactant(s), extender(s)/cross-linker(s), catalyst(s) and other additive(s). The resulting resin blend was mixed for 60 minutes using an air driven mixer at 300–500 rpm at 23° C. The resin blend, together with isocyanate(s), was immediately loaded into a Cannon™ H40/2S high pressure impingement mixing foam dispenser equipped with an HPL-18 mixing head. The foamable composition was mixed at 2000–3000 psi and then poured into the mold. The foamable composition was dispensed in a 10"×10"×4" aluminum mold heated to 65° C. The foam was demolded after 6 minutes and left to cool down to 23° C. and ~50% relative humidity where it was kept at these conditions for 7 days prior to testing.

The resultant foams were subjected to various tests. The results of these tests are reported in Table 2.

In Table 2, the glass transition temperature (Tg) was determined by Dynamic Mechanical Thermal Analysis (DMTA) in accordance with ASTM D4065-93, adapted to measure Tg at the onset of the drop in the elastic modulus. The equipment used for the test was obtained from Rheometric Scientific (Model DMTAIV). The following test conditions were employed:

| | |
|---|---|
| Sample size: | Length 7 mm |
| | Diameter 16 mm |
| Test type: | Dynamic Temperature Ramp |
| Mode: | Compression |
| Initial temperature: | −75° C. |
| Final temperature: | +150° C. |
| Ramp rate: | 3.5°C./minute |
| Frequency: | 1 Hz |
| Strain: | 0.1% |
| Cooling agent: | Liquid nitrogen |

During the course of the test, the stored modulus (E') (or stored elastic energy) for each sample was routinely recorded. The loss modulus (E") (or viscous energy dissipation) and the ratio of loss modulus to stored modulus (E"/E'), also known as tan δ, were calculated and are reported in Table 2. As is known in the art, tan δ may be used to infer the amount of energy dissipated as heat during deformation of the foam. It is highly desirable to have a foam with a tan δ that does not vary greatly over as wide a temperature range as possible. This is particularly so when the foam is being used in an energy management capacity such as a vehicular trim element where the vehicle may be in service over a wide range of temperatures.

With further reference to Table 2, the ball rebound property of each foam sample was determined using ASTM D-3574H as an average of three measurements taken in three different locations of the test sample. The equipment used was a Ball Rebound Tester (Model TT502), commercially available from Time Tech.

With further reference to Table 2, the compression set at 50% deflection of each foam sample was determined using ASTM D-3574 (Test D).

The results reported in Table 2 and illustrated in FIG. 1 clearly illustrate the superiority of the foam samples produced in Examples 1–5.

As will be appreciated by those of skill in the art, the "viscoelasticity" of the foam samples is assessed by measuring the ball rebound property of each foam sample. Further, energy dissipation is assessed by measuring impact. Still further the low temperature behaviour and predictability of other physical properties is assessed by measuring Tg and tan δ, respectively, of each foam sample. Finally, the elastic property was assessed by measuring compression set (CS) at 50% deflection of each foam sample.

With particular reference to FIG. 1, it will be seen that the tan δ value for each foam is relative unchanged—i.e., the curve is relatively flat—over a broad temperature range (e.g., −30° C. to +105° C.). Thus, the polymer in foam can be said to have a substantially predictable and constant response to an applied load over a broad temperature. With reference to Table 2, the relatively low Tg values of the foams of Examples 1–5 illustrate that the polymer remains relatively soft at low temperatures. The ball rebound results illustrate that the foams of Examples 1–5 have low resiliency (i.e., ball rebound less than about 30%). Finally, the compression set results, illustrates that the foams of Examples 1–5 have a desirable degree of elasticity.

The combination of these properties renders the foams produced in Examples 1–5 particularly useful in the interior of a vehicle where the service temperature of the vehicle may vary within such broad temperature ranges. Thus, the foams produced in Examples 1–5 are particularly advantageous since they can dissipate energy upon impact and the can behave relatively consistently at different temperatures within these broad temperatures ranges.

With reference to Table 3, there is shown a further comparison between foams produced in Examples 1 and 3, and commercially available foams which marketed as being temperature sensitive (designated as VEF-1, VEF-2 and VEF-3). The effect of increasing the relative humidity environment at ambient temperature (23° C.) of these foams was assessed by increasing the relative humidity from 50% to 98% and measuring the ball rebound property of the foam. The results are reported in Table 3. As shown, the foams of Examples 1 and 3 had a slightly lower ball rebound (i.e., they became more viscoelastic) with increasing humidity whereas the foams of VEF-1, VEF-2 and VEF-3 exhibited significant increases in ball rebound (i.e., they became less viscoelastic) with increasing humidity. The changes seen in VEF-1, VEF-2 and VEF-3 were so significant that they could not be classified as viscoelastic foams under the changed humidity conditions—this is not unexpected based on the current state of the art.

With reference to Table 4, there is shown a further comparison between foams produced in Examples 1 and 3, and commercially available foams VEF-1 and VEF-3. The effect of increasing the temperature environment at constant relative humidity (50%) of these foams was assessed by measuring the ball rebound property of each foam sample at 23° C. and at 80° C. The results are reported in Table 3. As shown, the foams of Examples 1 and 3 had a slightly higher ball rebound (i.e., they became slightly less viscoelastic) with increasing temperature whereas the foams of VEF-1 and VEF-3 exhibited significant increases in ball rebound (i.e., they became significantly less viscoelastic) with increasing temperature. The changes seen in VEF-1, VEF-2 and VEF-3 were so significant that as the environmental temperature increase, they can not be classified as viscoelastic foams—this is not unexpected based on the current state of the art.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

TABLE 1

| | Example | | | | |
|---|---|---|---|---|---|
| Ingredient | 1 | 2 | 3 | 4 | 5 |
| Voranol ™ V4815 | 45 | 45 | 41 | 42 | 50 |
| E850 | 17 | 17 | 15 | 20 | 10 |
| Poly G20-56 | 30 | 30 | 15 | 28 | 15 |
| Poly G20 112 | — | — | 15 | — | 15 |
| Isonate ™ 143L | 30.2 | 30.5 | 30.8 | 6.3 | — |
| Rubinate ™ 7302 | 28.2 | 28.5 | 28.7 | 52.9 | 75.4 |
| DPG | 8 | 8 | 7 | 10 | 10 |
| DEOA-LF | — | — | — | — | 0.42 |
| Water | 2.56 | 2.56 | 2.45 | 2.3 | 3.20 |
| V-4053 | — | — | — | 0.8 | 1.2 |
| Kraton ™ 1203 | — | 8 | 7 | — | — |
| Dabco 33LV | 0.5 | 0.5 | 0.6 | 0.48 | 0.53 |
| Niax ™ A-1 | 0.1 | 0.1 | 0.1 | 0.06 | 0.10 |
| NP-50 | 0.2 | 0.2 | 0.5 | 0.2 | 0.22 |
| B-8240 | 1.25 | 1.25 | 0.6 | 0.1 | 0.12 |
| B-4690 | 0.4 | 0.4 | 0.4 | — | 0.80 |
| B-4113 | — | — | — | 0.8 | — |
| DC-5169 | — | — | — | — | 0.2 |
| Cereclor ™ S-56 | 8 | — | 8 | 8 | 8 |

TABLE 2

| Example | Tg (° C.) | Tan δ: Measured Tg to +60° C. | | | | BR[2] (%) | CS[3] (%) |
|---|---|---|---|---|---|---|---|
| | | Min. | Max | Median | Var.[1] (%) | | |
| 1 | −31 | 0.26 | 0.32 | 0.29 | 10.3 | 19 | 88 |
| 2 | −35 | 0.20 | 0.30 | 0.25 | 20.0 | 19 | 89 |
| 3 | −28 | 0.26 | 0.39 | 0.325 | 20.0 | 16 | 90 |
| 4 | −25 | 0.22 | 0.39 | 0.305 | 27.9 | 23 | 37 |
| 5 | −31 | 0.21 | 0.37 | 0.29 | 27.6 | 26 | 55 |

[1]Var. = maximum variance (+ or −) from median value of Tan δ
[2]BR = ball rebound
[3]CS = compression set at 50% deflection

TABLE 3

| Sample | Change in Ball Rebound Property (%) |
|---|---|
| Example 1 | −14 |
| Example 3 | −14 |
| VEF-1 | +140 |
| VEF-2 | +100 |
| VEF-3 | +800 |

TABLE 4

| Sample | Ball Rebound @ 23° C. (%) | Ball Rebound @ 80° C. (%) |
|---|---|---|
| Example 1 | 19 | 21 |
| Example 3 | 16 | 22 |
| VEF-1 | 5 | 31 |
| VEF-3 | 1 | 13 |

What is claimed is:

1. A flexible isocyanate-based polymeric foam which has:
   (i) low resiliency;
   (ii) a Tg less than or equal to about 0° C.; and
   (iii) a change in tan δ less than or equal to about 35% from a median value measured over a temperature range of from about −20° to about +60° C.

2. The isocyanate-based foam defined in claim 1, wherein the Tg is less than about −10° C.

3. The isocyanate-based foam defined in claim 1, wherein the Tg is in the range of from about −15° to about −40° C.

4. The isocyanate-based foam defined in claim 1, wherein Tg is in the range of from about −15° to about −37° C.

5. The isocyanate-based foam defined in claim 1, wherein the Tg is in the range of from about −20° to about −30° C.

6. The isocyanate-based foam defined in claim 1, wherein the change in tan δ is less than or equal to about 20% from a median value.

7. The isocyanate-based foam defined in claim 1, wherein the change in tan δ is in the range of from about 10% to about 15% from a median value.

8. The isocyanate-based foam defined in claim 1, wherein the change in tan δ from the median value is measured over a temperature range of from about −20° to +80° C.

9. The isocyanate-based foam defined in claim 1, wherein the change in tan δ from the median value is measured over a temperature range of from about −30° to +100° C.

10. The isocyanate-based foam defined in claim 1, wherein the foam is derived from a reaction mixture comprising:
    urethane-forming chemicals;
    water; and
    a plasticizer selected from the group comprising:
        a halogenated paraffin, a ($C_2$/$C_4$) aliphatic polymer comprising a primary hydroxyl group, and mixtures thereof.

11. A vehicular interior trim panel comprising the polyurethane foam defined in claim 1.

* * * * *